United States Patent [19]

Scarborough

[11] Patent Number: 5,035,107
[45] Date of Patent: Jul. 30, 1991

[54] LAWN MOWER WITH TRIMMING ATTACHMENT

[76] Inventor: Joseph H. Scarborough, 551 Hilltop Rd., Elkton, Md. 21921

[21] Appl. No.: 529,612

[22] Filed: May 29, 1990

[51] Int. Cl.$^5$ ............... A01D 34/66; A01D 34/82; A01D 34/83
[52] U.S. Cl. .................... 56/10.4; 56/10.2; 56/10.6; 56/13.6; 56/17.5
[58] Field of Search .............. 56/10.2, 10.4, 10.6, 56/13.6, 16.9, 17.5

[56] References Cited

U.S. PATENT DOCUMENTS

| | | | |
|---|---|---|---|
| 2,960,811 | 11/1960 | Roesel | 56/10.4 |
| 3,545,184 | 12/1970 | Liepold et al. | 56/10.4 X |
| 3,665,685 | 5/1972 | Allard | 56/10.4 |
| 3,668,845 | 6/1972 | Parker | 56/16.9 X |
| 4,453,372 | 6/1984 | Remer | 56/16.9 X |
| 4,518,043 | 5/1985 | Anderson et al. | 56/10.4 X |
| 4,573,306 | 3/1986 | Smith et al. | 56/13.6 X |

*Primary Examiner*—George A. Suchfield
*Attorney, Agent, or Firm*—Mortenson & Uebler

[57] ABSTRACT

A rotary lawn mower having a trimming attachment for trimming around fence posts and the like is provided. The trimming attachment assembly includes an auxiliary trimming blade mounted in a housing and attached to a swing arm assembly mounted on the primary mower housing. In the forward position, the trimming attachment extends outwardly from, but slightly overlaps, the mowed path of the primary mower. The trimming blade preferably is driven by the primary mower motor. As a fence post or the like adjacent the primary mower is encountered by the trimming attachment assembly, the trimming attachment assembly is pushed rearwardly by the obstruction and swings into the mowed path of the primary mower, during which process the grass near the fence post is cut. As the fence post or other object is passed, an actuator assembly forces the trimming assembly back into its original forward auxiliary cutting position.

16 Claims, 4 Drawing Sheets

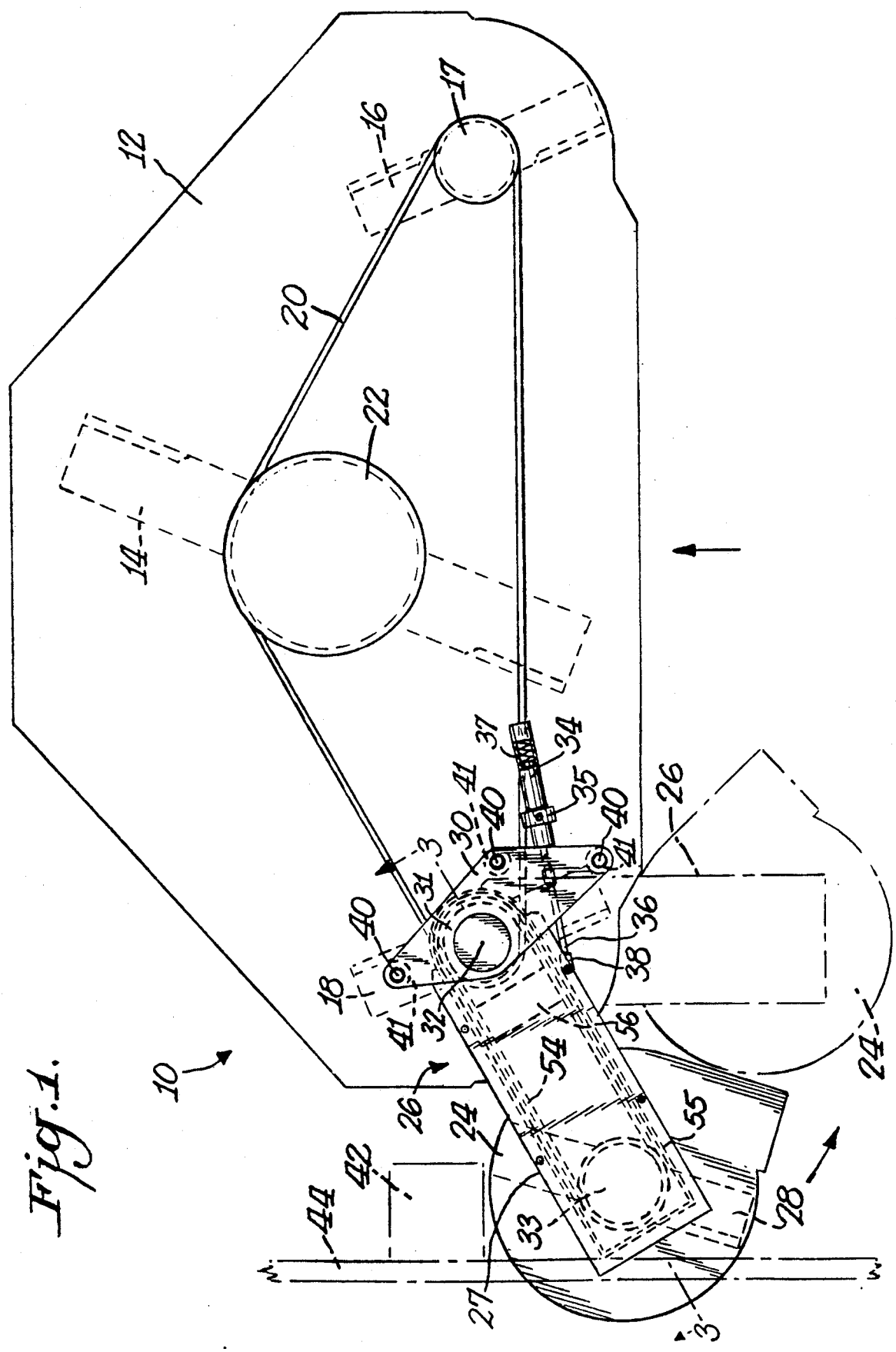

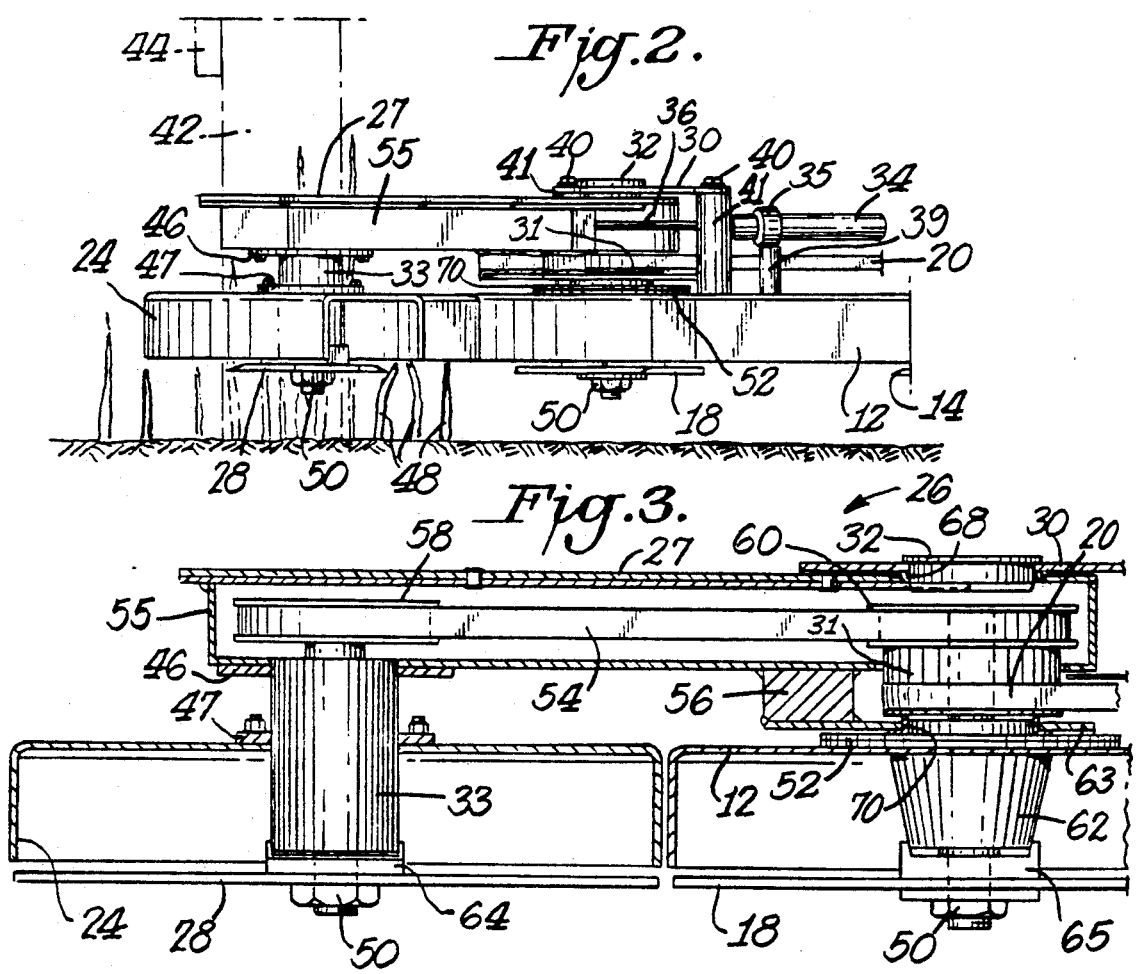

LAWN MOWER WITH TRIMMING ATTACHMENT

BACKGROUND OF THE INVENTION

The invention relates to rotary lawn mowers and, more particularly, to lawn mowers having auxiliary trimming attachments for trimming around obstacles such as fence posts and the like, the trimming being accomplished simultaneously as the primary mower passes adjacent the obstacle.

Rotary type lawn mowers having various edging or trimming auxiliary units attached to them are known. Exemplary of these are the following:

| U.S. Pat. Nos. | |
| --- | --- |
| 3,236,037 | (Porterfield) |
| 3,490,213 | (Pinto) |
| 3,668,845 | (Parker) |
| 3,715,872 | (Thompson, Jr.) |
| 3,782,085 | (Parker et al) |
| 3,789,591 | (Emery) |
| 4,170,099 | (Owens) |
| 4,242,855 | (Beaver, Jr.) |
| 4,453,372 | (Remer) |
| 4,642,976 | (Owens) |
| 4,653,254 | (Qualls) |
| 4,663,920 | (Skovhoj) |
| 4,718,221 | (Wessell et al) |
| 4,896,488 | (Duncan et al) |

Many prior mower attachments for either edging or trimming involve difficult and cumbersome apparatus to engage or disengage. Reference is directed to the prior patents cited above.

A problem of certain prior mowers was the control of their auxiliary trimming units. Often, moving the auxiliary unit was dangerous because such adjustments could not be accomplished remotely or it required a plurality of levers or controls and a conscious sequencing thereof.

The present invention obviates problems associated with prior mowers having auxiliary trimming attachments.

Various types of conventional rotary lawn mower types and blade configurations are generally well known. Reference is directed, for example, to Wheelhorse Products, Inc.'s catalog "Bulletin 050988", which shows several configurations. The auxiliary trimming attachment of this invention may be adapted to virtually any known primary rotary lawn mower configuration.

SUMMARY OF THE INVENTION

Rotary lawn mower apparatus is provided. The apparatus includes a primary mower housing, an engine for driving at least one primary grass cutting blade in the primary housing, the apparatus having a powered trimming attachment assembly rotatably mounted on the primary mower housing by means of a swing arm assembly. The trimming attachment assembly includes an auxiliary trimming blade mounted in a housing attached to the swing arm assembly, the trimming attachment assembly being rotatably movable from a forward position extending laterally and outwardly from the primary mower housing such that the trimming blade path slightly overlaps the mowed path of the primary blade, to a rearward position located substantially behind and within the mowed path of the primary mower. The primary housing has affixed thereto an actuator assembly which extends to and is affixed to the swing arm assembly. The actuator assembly comprises means tending to force the swing arm assembly to its forward position. When an obstruction such as a fence post or the like adjacent the primary mower is encountered by the trimming attachment, the trimming attachment assembly is forced rearwardly by the obstruction and swings into the mowed path of the primary mower, during which movement the grass near and around the obstruction is cut by the auxiliary trimming blade, and, as the obstruction is passed, the actuator assembly forces the trimming attachment assembly back into its original forward auxiliary cutting position until another obstacle is encountered. The lawn mower apparatus may have multiple primary grass cutting blades. The auxiliary trimming blade may be driven by the engine which drives the primary blade(s) or it may be driven by an auxiliary power unit such as a hydraulic motor, an electric motor or a separate internal combustion engine. The actuator assembly's means tending to force the swing arm assembly to its forward position may be spring means, including mechanical spring means or gas spring means. The actuator assembly's means tending to force the swing arm assembly to its forward position may be hydraulically or pneumatically actuated.

BRIEF DESCRIPTION OF THE DRAWINGS

FIG. 1 is a top plan View of a primary rotary lawn mower having a trimming attachment according to the invention.

FIG. 2 is a rear elevational view of the trimming attachment assembly of the invention shown in FIG. 1.

FIG. 3 is a cross-sectional view of the trimming attachment assembly taken substantially along line 3—3 of FIG. 1.

Figure 5:
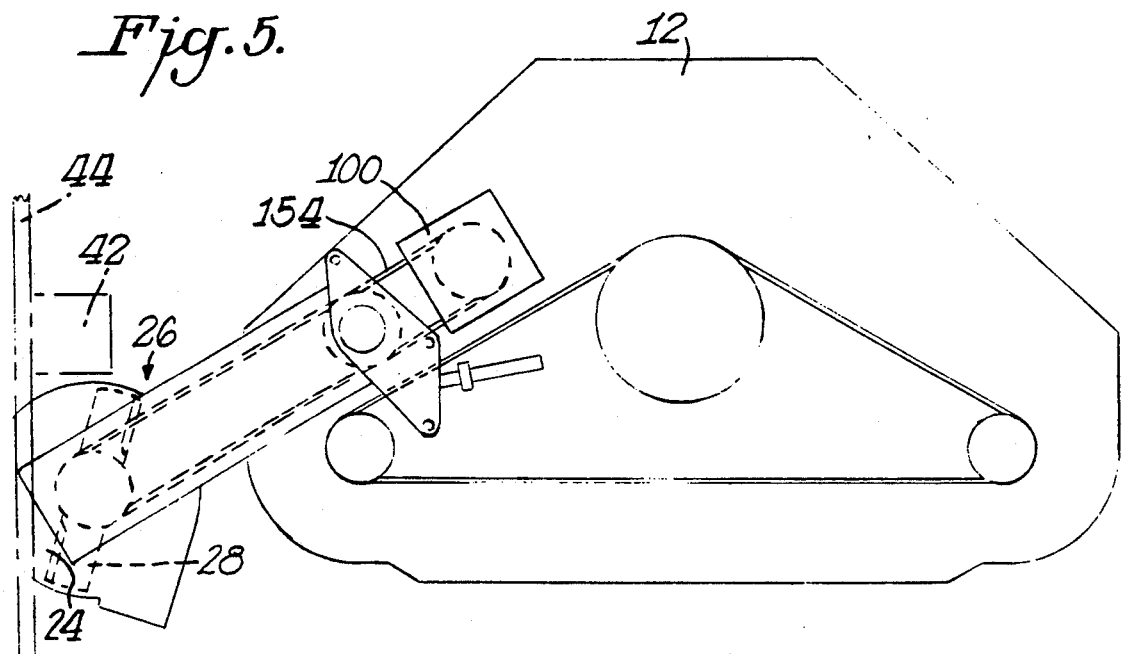
FIG. 5 is a top plan view of apparatus according to the invention wherein the auxiliary trimming blade is driven by an auxiliary power unit.

DETAILED DESCRIPTION OF THE INVENTION AND PREFERRED EMBODIMENTS WITH REFERENCE TO THE DRAWINGS

A rotary lawn mower having a trimming attachment for trimming around fence posts and the like is provided. The trimming attachment assembly includes an auxiliary trimming blade mounted in a housing and attached to a swing arm assembly mounted on the primary mower housing. In the forward position, the trimming attachment extends outwardly from, but slightly overlaps, the mowed path of the primary mower. The trimming blade preferably is driven by the primary mower motor. As a fence post or the like adjacent the primary mower is encountered by the trimming attachment assembly, the trimming attachment assembly is pushed rearwardly by the obstruction and swings into the mowed path of the primary mower, during which process the grass near the fence post is cut. As the fence post or other object is passed, an actuator assembly forces the trimming assembly back into its original forward auxiliary cutting position.

Basically, the invention provides an auxiliary mower trim blade assembly on a swing arm whose mowed path normally, in the fully extended position, slightly overlaps the mowed path of the primary mower. The trim blade assembly functions by swinging rearwardly into the mowed path of the primary mower, as required, as an object adjacent the primary mower is passed. The auxiliary trimming unit permits non-critical guidance for trimming along vertical walls, landscaping ties, fence posts, and the like. The unit increases the total mowing width of the primary mower when the auxiliary unit is not in a deflected position. The auxiliary unit also provides a low profile extension of the primary mower for mowing under bushes, tree branches, fence rails and the like.

As stated hereinabove, auxiliary units can be adapted to virtually any primary rotary mower configuration, including tractors, in front mounted, center mounted or aft mounted locations. In all of these locations, the primary mower assembly can have single or multiple primary mower blades.

On mowers that turn clockwise (looking down), the preferred mounting location is on the left hand side. There are two primary reasons for this. First, the torque required to overcome the friction in the drive train, and the forces required in cutting, produce a moment that tends to restore the swing arm to the forward position. (This is not generally true if the auxiliary swing mower is deriving its power from a direct mounted hydraulic or electric motor, or a flexible shaft.) Secondly, the discharge from the auxiliary swing blade should be onto the path of the main mower and not against the object that is being trimmed.

A detailed description of the invention and preferred embodiments is best provided with reference to the accompanying drawings, wherein FIG. 1 is a top plan view of the rotary lawn mower apparatus according to the invention.

Therein, the overall apparatus 10 comprises the primary motor housing 12 which houses primary mower blades 14, 16 and 18, all of which are rotatably driven by belt 20 and primary mower drive pulley 22 which is driven conventionally by the primary engine motor (not shown for clarity). Primary blade 16 is driven by drive pulley 17. The arrow beneath the primary mower in FIG. 1 indicates the direction of motion of the entire assembly 10.

Affixed to the housing 12 of the primary mower is the auxiliary trimming attachment apparatus 26 of the invention. This auxiliary apparatus 26 includes secondary mower blade housing 24 which houses auxiliary blade 28. Housing 24 is affixed to swing arm 27 by means of bearing arbor 33. The swing arm 27 extends to trunnion pin 32 and a projection on the bearing arbor 62 which extends through plate 30, swing arm 27 and support plate 63. This assembly, including swing arm 27, to which is attached the auxiliary trim blade apparatus, trunnion 32, plate 30 and bearing arbor 62 are affixed to primary mower housing 12 by means of bolts 40 and spacers 41.

The activator assembly, which is affixed to primary mower housing 12 as discussed further below, includes housing 34, which houses the return force means 37, shown as a mechanical spring in the broken away portion of housing 34. The activator has pivot means 35 rotatably affixed to housing 12 by pivot 39. Extensible activator rod 36 extends and is affixed to clevis 38 which is affixed to the housing 55 extending under swing arm 27.

Drive belt 54 and spacer 56, to be discussed more fully below, are shown in FIG. 1 for completeness.

The entire mower assembly is shown advancing, indicated by the arrow below the primary mower, past a fence including rail 44 and post 42. As the unit passes the fence, the fence post 42 obstructs the path of the swing arm assembly 26 and causes the assembly to swing rearwardly as indicated by the rotational arrow. In the most rearwardly position, when the primary mower housing 12 is very close to the adjacent obstacle 42, the auxiliary trim assembly 26 is as shown in phantom.

As the swing arm assembly 26 moves rearwardly, it causes the activator rod 36 to move into the assembly housing 34 and to compress spring mechanism 37. As the obstacle 42 is passed, the rearward force on the swing arm assembly 26 is removed and the activator arm 36 causes the assembly 26 to return to its original, forward-most position. During this process, the grass around the obstacle is trimmed.

FIG. 2 shows a rear elevation of the auxiliary trimming attachment assembly of the invention. Main mower housing 12 is shown housing blades 14 and 18, affixed to their respective shafts by nuts 50. Primary mower drive belt 20 extends around the double pulley 31 and provides power thereto, rotating cutting blade 18. The swing arm assembly 26 is shown affixed to housing 12 by means of top plate 30, bolts 40 and spacers 41. Swing arm 27, with its attached pulley housing 55, extends outwardly from the trunnion pin 32 and, at its outer end, carries the auxiliary trim blade assembly. The auxiliary trim blade assembly includes auxiliary trim blade 28 affixed to bearing arbor 33 by blade retaining nut 50, and having housing 24. Flanges 46 and 47 and bearing 70 are shown for completeness. The drive mechanism contained within housing 55 is described more fully below in connection With the description of FIG. 3. The actuator assembly housing 34 for the spring mechanism 37 and pivot portion 35 of the activator assembly are affixed to pivot post 39 which is affixed to housing 12. Activator rod 36 is affixed to housing 55 of swing arm assembly 26 by means of clevis 38. Grass 48 is depicted being trimmed by the trim assembly 26.

FIG. 3 is a cross-sectional view taken substantially along line 3—3 of FIG. 1 showing the drive mechanism for driving the auxiliary trim blade 28. Therein is shown primary mower drive belt 20 extending around trunnion pulley 31 and rotatably driving primary mower blade 18 affixed to the trunnion as shown. The assembly includes bearing arbor 62, support plate 63, bearing shield 65 and bearing 70. Blade retaining nut 50 holds blade 18 in place. Through the openings in swing arm 27, extends bearing 68 and trunnion pin 32. Flange 52 and spacer 56 are shown for completeness.

Drive belt 54 extends around the primary mower driver pulley 60 and thence around the secondary, trimming, driven mower pulley 58. Power is thereby transmitted to the auxiliary trimming blade 28 held in place within bearing arbor 33 by blade retaining nut 50. Flanges 46 and 47 and bearing shield 64 are also shown.

The swing arm assembly, generally, may be extended by a spring-loaded actuator (mechanical spring or a gas spring) and is countered by the deflecting force provided by the object being trimmed.

Actuators that are hydraulically (or pneumatically) actuated, may be controlled by a sensing wand that contacts the object being trimmed.

An alternate arrangement that uses a method of restoring the swing arm to the forward position (such as a spring, gas spring or air cylinder) and latching it in that position, until unlatched by the object being trimmed is contemplated. The purpose of this is to rigidly hold the swing arm assembly in the fully extended position yet requiring a minimal force to unlatch it and to rotate it into a deflected position.

Figure 4:
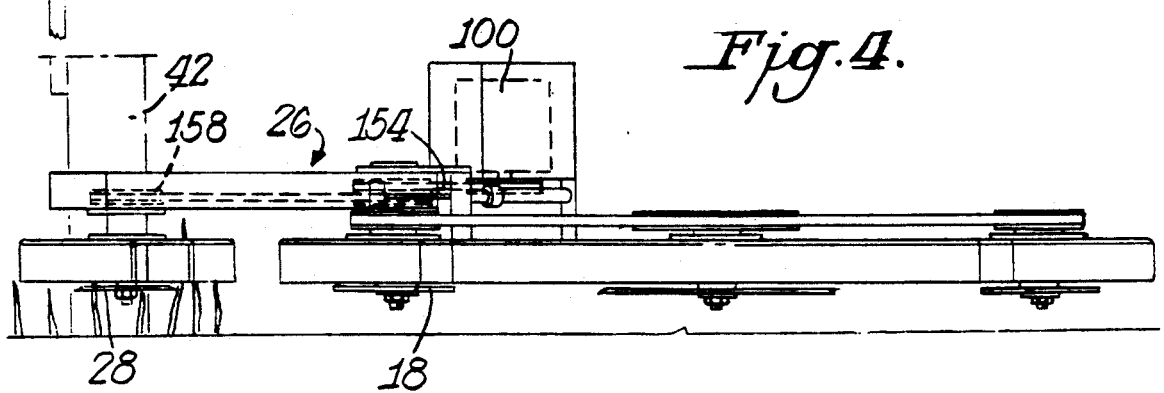
FIG. 4 is a rear elevational view of apparatus according to the invention wherein the auxiliary trimming blade is driven by an auxiliary power unit.

In FIG. 4, the rotary lawn mower apparatus according to the invention is shown in rear elevation and wherein the auxiliary trimming blade 28 is driven by an auxiliary power unit 100 by means of belt 154 and pulleys 131 and 158.

The apparatus depicted in FIG. 4 is shown in a top plan view in FIG. 5 wherein the auxiliary power unit 100 is mounted on primary mower housing 12. The trimming blade 28 is driven by belt 154 extending from the auxiliary power unit 100. The auxiliary power unit may be any of the conventional motors such as a hydraulic motor, an electric motor or a separate internal combustion engine.

Figure 6:
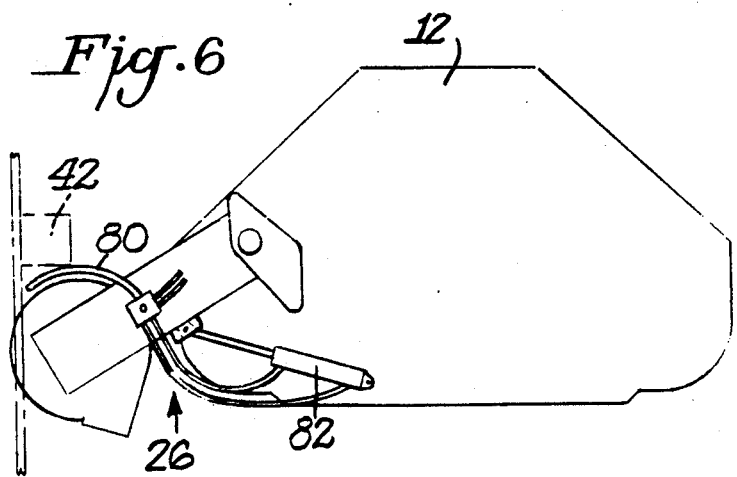
FIG. 6 shows the lawn mower apparatus wherein the actuator assembly's means tending to force the swing arm assembly to its forward and aft position is hydraulically or pneumatically actuated, controlled by a wand attached to a hydraulic valve.

FIG. 6 shows the lawn mower apparatus wherein the actuator assembly's means tending to force the swing arm assembly 26 to its forward and aft position is hydraulically or pneumatically actuated, controlled by a wand 80 attached to a hydraulic valve 82.

Figure 7:
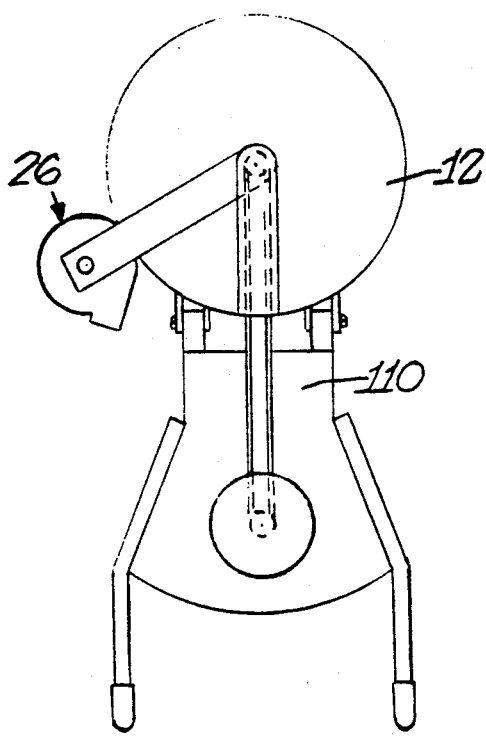
FIG. 7 depicts the lawn mower apparatus wherein the primary mower is mounted forward of drive wheels which propel the apparatus.

FIG. 7 depicts the lawn mower apparatus wherein the primary mower is mounted forward of the drive wheels of the tractor 110 which propel the apparatus.

Figure 8:
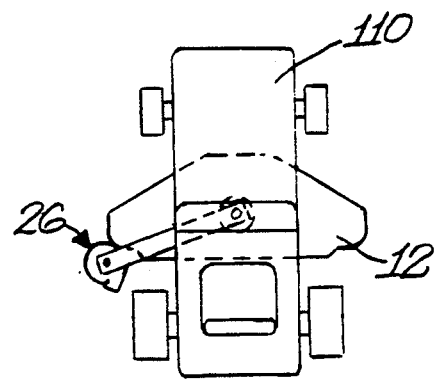
FIG. 8 depicts the lawn mower apparatus wherein the primary mower is mounted centrally with respect to drive wheels which propel the apparatus.

FIG. 8 depicts the lawn mower apparatus wherein the primary mower is mounted centrally with respect to the drive wheels of tractor 110 which propel the apparatus.

Figure 9:
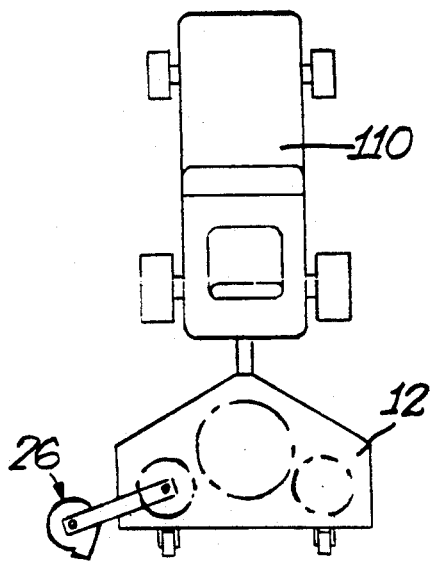
FIG. 9 depicts the lawn mower apparatus wherein the primary mower is mounted aft of drive wheels which propel the apparatus.

FIG. 9 depicts the lawn mower apparatus wherein the primary mower is mounted aft of the drive wheels of tractor 110 which propel the apparatus. The primary mower is shown being towed by lawn tractor 110.

The materials of construction of the assembly can be any of those known to persons skilled in this art, including steel, aluminum, magnesium, zinc, fiberglass, plastic and the like.

A condition can exist where the swing arm has extended behind an object making it virtually impossible to back up without retracting the swing arm assembly. For this reason, preferred mower design is such that a means is provided for the operator to be able to retract the swing arm into the fully retracted position. This feature may also allow the operator direct control of the swing arm for some trimming operations.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow. For example, the mowing apparatus depicted in the drawings may be mounted centrally with respect to the drive wheels (not shown) which propel the apparatus, or the mowing apparatus may be mounted fore or aft of the drive wheels. All of these configurations are known to persons skilled in the art and are considered to be equivalents.

What is claimed is:

1. Rotary lawn mower apparatus comprising a primary mower housing, an engine for driving at least one primary grass cutting blade in said primary housing and having a powered trimming attachment assembly rotatably mounted on said primary mower housing by means of a swing arm assembly, wherein said trimming attachment assembly includes an auxiliary trimming blade mounted in a housing attached to said swing arm assembly, the trimming attachment assembly being rotatably movable from a forward position extending laterally and outwardly from the primary mower housing such that the trimming blade path slightly overlaps the mowed path of the primary blade, to a rearward position located substantially behind and within the mowed path of the primary mower, said primary housing having affixed thereto an actuator assembly which extends to and is affixed to said swing arm assembly, said actuator assembly comprising means tending to force said swing arm assembly to its said forward position, wherein said auxiliary trimming blade is driven by belt means taking power from said engine such that, when an obstruction such as a fence post or the like is encountered by the trimming attachment assembly, adjacent said primary mower, the trimming attachment assembly is forced rearwardly by the obstruction and swings into the mowed path of the primary mower, during which movement the grass near and around said obstruction is cut by said auxiliary trimming blade, and, as said obstruction is passed, said actuator assembly forces the trimming attachment assembly back into its original forward auxiliary cutting position until another obstacle is encountered.

2. The lawn mower apparatus of claim 1 having multiple primary grass cutting blades.

3. The lawn mower apparatus of claim 1 wherein said auxiliary trimming blade is driven by said engine which drives said primary blade.

4. The lawn mower apparatus of claim 1 wherein said actuator assembly's means tending to force said swing arm assembly to its forward position comprises spring means.

5. The lawn mower apparatus of claim 4 wherein said actuator assembly's means tending to force said swing arm assembly to its forward position comprises mechanical spring means.

6. The lawn mower apparatus of claim 4 wherein said actuator assembly's means tending to force said swing arm assembly to its forward position comprises gas spring means.

7. The lawn mower apparatus of claim 1 wherein said actuator assembly's means tending to force said swing arm assembly to its forward and aft position is hydraulically actuated, controlled by a wand attached to a hydraulic valve.

8. The lawn mower apparatus of claim 1 wherein said actuator assembly's means tending to force said swing arm assembly to its forward position is pneumatically actuated.

9. The lawn mover apparatus of claim 1 wherein said primary mower is mounted forward of drive wheels which propel the apparatus.

10. The lawn mower apparatus of claim 1 wherein said primary mower is mounted centrally with respect to drive wheels which propel the apparatus.

11. The lawn mower apparatus of claim 1 wherein said primary mower is mounted aft of drive wheels which propel the apparatus.

12. The lawn mower apparatus of claim 11 wherein said primary mower is mounted on a trailer towed by a lawn tractor.

13. Rotary lawn mower apparatus comprising a primary mower housing, an engine for driving at least one primary grass cutting blade in said primary housing and having a powered trimming attachment assembly rotatably mounted on said primary mower housing by means of a swing arm assembly, wherein said trimming attachment assembly includes an auxiliary trimming blade mounted in a housing attached to said swing arm assembly, the trimming attachment assembly being rotatably movable from a forward position extending laterally and outwardly from the primary mower housing such that the trimming blade path slightly overlaps the mowed path of the primary blade, to a rearward position located substantially behind and within the mowed path of the primary mower, said primary housing having affixed thereto an actuator assembly which extends to and is affixed to its said forward position, wherein said auxiliary trimming blade is driven by belt means taking power from an auxiliary power unit such that, when an obstruction such as a fence post or the like is encountered by the trimming attachment assembly, adjacent said primary mower, the trimming attachment assembly is forced rearwardly by the obstruction and swings into the mowed path of the primary mower, during which movement the grass near and around said obstruction is cut by said auxiliary trimming blade, and, as said obstruction is passed, said actuator assembly forces the trimming attachment assembly back into its forward auxiliary cutting position until another obstacle is encountered.

14. The lawn mower apparatus of claim 13 wherein said auxiliary power unit is a hydraulic motor.

15. The lawn mower apparatus of claim 13 wherein said auxiliary power unit is an electric motor.

16. The lawn mower apparatus of claim 13 wherein said auxiliary power unit is a separate internal combustion engine.

* * * * *